United States Patent
Ash et al.

[11] 3,753,157
[45] Aug. 14, 1973

[54] LEAKY WAVE COUPLERS FOR GUIDED ELASTIC WAVE AND GUIDED OPTICAL WAVE DEVICES

[75] Inventors: Eric A. Ash, London, England; Mark L. Dakss, Yonkers; Lawrence Kuhn, Ossining, both of N.Y.

[73] Assignee: International Business Machine Corporation, Armonk, N.Y.

[22] Filed: June 30, 1971

[21] Appl. No.: 158,237

[52] U.S. Cl. .............. 333/7 R, 333/10, 333/30 R, 333/84 R, 350/96 WG, 350/160
[51] Int. Cl. ............................................. H01p 1/10
[58] Field of Search ..................... 333/30, 72, 10; 350/96, 96 WG

[56] References Cited
UNITED STATES PATENTS

| | | | |
|---|---|---|---|
| 3,624,406 | 11/1971 | Martin et al............ | 350/96 WG UX |
| 3,406,358 | 10/1968 | Seidel .................... | 333/72 |
| 3,626,334 | 12/1971 | Keyes..................... | 333/30 |
| 3,400,341 | 9/1968 | Sittig...................... | 333/30 |
| 3,289,114 | 11/1966 | Rowen .................... | 333/30 |
| 3,589,794 | 6/1971 | Marcatili................. | 350/96 |

OTHER PUBLICATIONS

Zernike et al., Improved Version of the Evanescent-Wave Coupler, IEEE Journal of Quantum Electronics, Sept. 1970, Pp. 577, 578.
E. Stern I.E.E.E. Transactions on Microwave Theory and Tech. Vol. MTT - 17 No. 11 Nov. 1969 p. 835–844

*Primary Examiner*—Paul L. Gensler
*Attorney*—John J. Goodwin et al.

[57] ABSTRACT

Couplers are disclosed for use with guided elastic waves and guided optical waves. The coupling is effected by means of a coupling region having a different phase velocity characteristic than that of the waveguide. The presence of the coupling region causes the waves traveling in the waveguide to become highly leaky. These leaky waves then encounter a second waveguide or transducer and are coupled into it. Utilizing the electro-acoustic effect in the acoustic wave devices and the electro-optic effect in the optical wave devices, the phase velocity characteristic of the coupling region is controllable, permitting switchable couplers.

8 Claims, 8 Drawing Figures

Patented Aug. 14, 1973

INVENTORS
ERIC A. ASH
MARK L. DAKSS
LAWRENCE KUHN

BY Maurice N. Kleiman
ATTORNEY 3,753,157

LEAKY WAVE COUPLERS FOR GUIDED ELASTIC WAVE AND GUIDED OPTICAL WAVE DEVICES

FIELD OF THE INVENTION

This invention relates to elastic waveguiding devices and optical waveguiding devices and, more particularly to elastic wave and optical wave couplers.

BACKGROUND OF THE INVENTION

Both bulk elastic waves and surface elastic waves are used in a variety of signal processing devices. While the existence of elastic waves has been known for many years, only recently have advances in such technologies as materials and fabrication permitted the practical implementation of elastic wave devices. The high interest in elastic wave resides in the fact that they are typically five orders of magnitude slower than electromagnetic waves. This much slower velocity of elastic waves enables transmission components such as filters, resonators, and delay lines to be constructed on subminiature scale. The further development of devices such as elastic wave amplifiers, detectors, and modulators make elastic wave technology an extremely valuable tool in electronic signal processing.

Similarily, recent development in materials and fabrication have also resulted in advances in guided optical wave technology. By using transparent, dielectric films, optical waveguides are constructed upon the surface of a material. The use of guided optical waves has overcome many of the difficulties involved in regular optical communication such as the critical placement of prisms, mirrors, and bulky lens.

Waveguide techniques used to guide elastic waves and optical waves are similar in many respects, and many techniques employed in one technology are applicable in the other. For example, both elastic waveguides and optical waveguides have phase velocity characteristics which are slower or less than the phase velocity characteristics of the surrounding medium. Another technique which is common to both guided elastic waves and guided optical waves is that of directional coupling. In the present state of the art, directional coupling of a guided wave from one waveguide to another is accomplished by bringing the first waveguide within close proximity to the second waveguide, the two waveguides running substantially parallel over a predetermined length. The optical waves and elastic waves couple from one waveguide to the other as a result of the evanescent portion of the wave outside the guide. These waves decay exponentially with respect to distance away from the waveguide and, thus, coupling between the two waveguides requires that they be close enough so that each lies in the region of decay of the other. In order to effect substantial coupling and to avoid significant impedance mismatch in the waveguides, the coupling must take place over a relatively long length of the waveguides. The strength of the coupling between the two waveguides is a function of the frequency of the wave and the relative distance between them over this predetermined relatively long length.

The difficulty of realizing such directional coupling has been a problem in the art. The requirement that the two waveguides be positioned within close proximity to one another and over a relatively long predetermined length represent serious limitations for guided wave layouts. Further, present directional coupling techniques offer no capability for switchable coupling.

Accordingly, a principle object of this invention is to couple efficiently elastic or optical waves from one waveguide to another.

It is another object of this invention to eliminate the requirements of close spacing of two waveguides for directional coupling.

It is another object of this invention to control the coupling between two waveguides electronically.

SUMMARY OF THE INVENTION

It has been discovered that elastic waves and optical waves propagating in a waveguide may be more efficiently coupled out of the waveguide by providing a coupling region for speeding up the propagation of the wave within the waveguide relative to the surrounding medium. Since the waves tend toward regions where the phase velocity characteristic is low, the waves leak outside of the waveguide as a result of this increased speed of propagation in the guide. Their change in field amplitude with respect to distance away from the guide decays in accordance with a trigonometric rather than the typically exponential function. Depending upon the frequency of the wave and the relative phase velocity characteristics of the material, significant energy is effectively leaked out of the waveguide. When the leaky waves then encounter a second waveguide, they are coupled into the second waveguide in a reverse, but similar manner. The coupling region may be comprised of a material which has a constant velocity characteristic, or it may be of a type whose phase velocity characteristic is controlled by the application of an external electric field. In the latter case, electrodes positioned close to the coupling regions permit the coupling of waves out of the waveguide to be electronically controlled. Whether the coupling region is within the waveguides or bordering outside the waveguide spacing between them is not critical.

DETAILED DESCRIPTION

In general, waveguides for guiding both elastic and optical waves in a solid medium operate on the principle that the waves propagate in those regions where the phase velocity characteristic is the lowest. In the case of optical waveguides, this is usually stated in terms of refractive indexes; the relationship being that the velocity of a guided optical wave is inversely related to the refractive index of the medium. The shape of the waveguide is an important factor to be considered. The reflection of the waves within the guide are directly related to the waveguide configuration and its cross-sectional dimensions relative to the wavelength of the wave. Longitudinal strip waveguides having rectangular cross-sectional areas such that the opposite side of the waveguides are approximately parallel to one another are commonly used. Waveguide cross-sectional configurations may take various other shapes, usually resulting in higher mode propagation. Whatever the particular shape of the cross-section of the longitudinal waveguide, the wave energy is not completely confined within the waveguides. Boundary condition analysis indicates that energy propagation in the waveguide has associated with it energy in the bulk surrounding material. The lower the ratio of the phase velocity characteristic of the waveguide to the phase velocity characteristic surrounding material, the greater the extent of energy outside the waveguide.

The devices disclosed herein couple energy out of the waveguide controllably and more efficiently by constructing the waveguide so that it becomes significantly leaky at the point where coupling is desired.

For a general reference paper to elastic waves and an extensive bibliography to other articles see Surface Elastic Waves by Richard M. White, proceedings of the IEEE, Vol. 58, No. 8, Aug. 1970, p. 1238–1276. A general review of optical waveguides is presented in Integrated Optical Circuit by James E. Goell, Proceedings of the IEEE, Vol. 58, No. 10, October 1970, p. 1504–1513. IEEE Transactions on Microwave Theory and Techniques, Vol. MTT-17, No. 11, November 1969, p. 800–1041, contains articles on elastic wave technology.

DESCRIPTION OF A SURFACE-TO-BULK WAVE COUPLER

Figure 1:
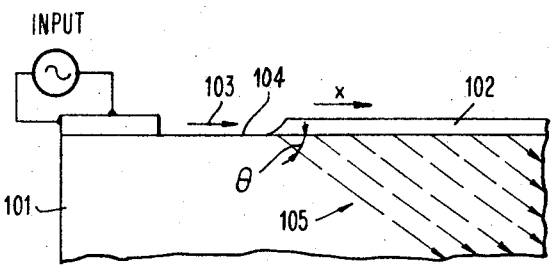
FIG. 1 shows a surface wave-to-bulk wave coupler.

FIG. 1 shows a configuration for coupling a surface wave into the bulk material 101 and demonstrates the principle of leaky wave coupling. Coupling is accomplished by means of surface layer 102, which has a higher shear velocity characteristic than that of the bulk material 101. When the surface wave 103 impinges upon the surface layer 102, phase matching implies that the bulk wave is radiated or leaked into bulk material 101 at an angle $\theta$, where $\theta = \cos^{-1}(V_b/V_s)$, $V_b$ being the shear velocity of bulk material 101 and $V_s$ being the surface wave velocity as determined by the surface layer 102. The surface wave velocity is generally slightly less than the phase velocity characteristics of surface layer 102 and is increased by the pressure of layer 102, thus causing the wave to leak into region 105.

In the leaky region 105, all the wave energy is flowing in a direction making an angle $\theta$ with surface 104. The length of surface layer 102 in the $x$ direction required to effect sufficient coupling is designated the coupling length. It is seen from FIG. 1 that the strength of coupling and the coupling length can be varied by varying the angle $\theta$. In general, $\theta$ is determined by the ratio of the velocity characteristics of bulk material 101 and surface layer 102. The velocity characteristic of surface layer 102 is determined by the material employed and the thickness of surface layer 102. For example, in the elastic wave case, lithium niobate can be used as bulk material 101. A material which has a faster phase velocity characteristic than lithium niobate and can be used as surface layer 102 is chromium. In the optical case, borosilicate glass as bulk material 101 and fused quartz as surface layer 102 result in the surface-to-bulk coupling. The optical waves can be maintained on surface 104 by ion bombardment which causes surface 104 to have a higher refractive index than the rest of bulk material 101. Another technique for maintaining optical waves on surface 104 is to deposit a thin film (not shown) on surface 104 having a higher refractive index than bulk material 101.

Figure 2A:
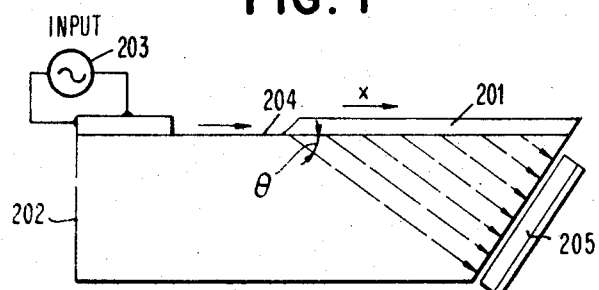
FIG. 2A shows a surface wave-to-bulk wave coupler in conjunction with a bulk wave transducer.

FIG. 2A shows a surface wave-to-bulk wave coupler. The presence of surface layer 201 on the surface of bulk material 202 causes a surface wave traveling in the $x$ direction to leak into the bulk material 202 in the same manner as in FIG. 1. Input means 203 couples energy onto surface 204. Bulk transducer 205, functioning as an output means, converts the bulk elastic wave into an electrical signal. In the elastic wave case, such an apparatus can be constructed using glass as bulk material 202, chromium as surface layer 201 and lithium niobate as input means 203 and bulk transducer 205. In the optical case, the same materials which were employed in the apparatus of FIG. 1 are suitable here and input means 203 and bulk transducer 205 can be lithium niobate.

Figure 2B:
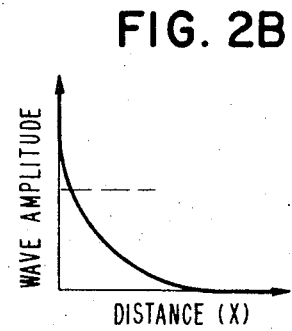
FIG. 2B shows a plot of wave amplitude versus a component of coupling length.

FIG. 2B is a plot of wave amplitude versus the distance along the surface layer 201. The FIG. 2B plot indicates that a surface layer 201 of sufficient length will result in total coupling of the surface wave into bulk material 202. The coupling length, X, is on the order of from 10 to 100 wavelengths, in order to avoid reflections due to impedance mismatch.

DESCRIPTION OF SURFACE-TO-SURFACE COUPLER

Figure 3:
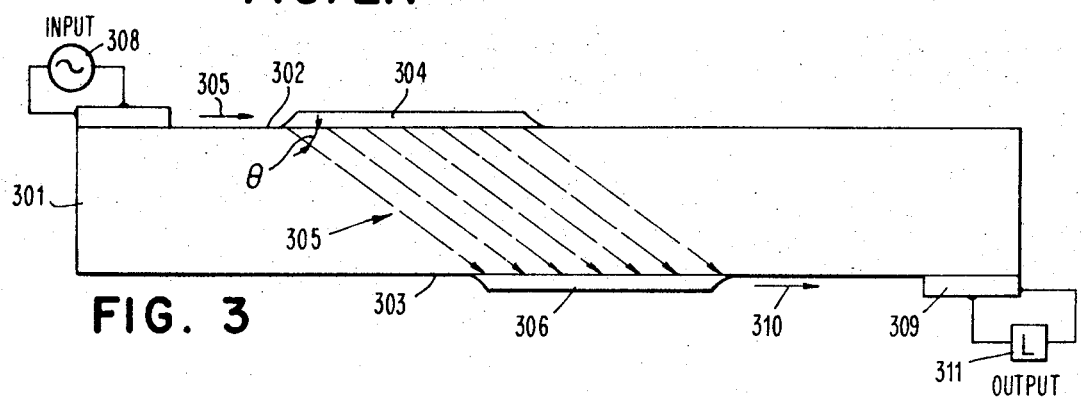
FIG. 3 shows a surface-to-surface directional coupler.

FIG. 3 shows a surface-to-surface coupler. Bulk material 301 is of a type in which surface waves can be maintained and has opposite surfaces 302 and 303, as shown. Surface layer 304 is placed upon surface 302 in the path of surface wave 305. The phase velocity characteristic of surface layer 304 is faster or greater than the phase velocity characteristic of bulk material 301. Surface layer 306, having a phase velocity characteristic greater than bulk material 301, and approximately equal to that of surface layer 304, is positioned on the opposite surface 303 of bulk material 301. Surface layer 306 is in a forward position relative to surface layer 304. The amount of the relative forward positioning of surface layer 306 is calculated by multiplying the thickness of bulk material 301 in the area of the surface-to-surface coupling by the sine of the angle $\theta$, where $\theta$ is the angle at which surface wave 305 will leak into bulk material 301. Input means 308 couples energy onto surface 302 as surface waves 305 and output means 309 couples surface waves 310 from surface 303 into load 311. The materials employed in the apparatus of FIG. 1 are also suitable here.

OPERATION OF SURFACE-TO-SURFACE COUPLER

In operation, surface wave 305 is coupled onto surface 302 by input coupler means 308. Surface wave 305 propagating along surface 302 of bulk material 301 encounters surface layer 304. Because of the higher phase velocity characteristic of surface layer 304, surface wave 305 leaks into bulk material 301 at an angle $\theta$. When the leaky bulk waves reach surface 303, surface layer 306 couples the leaky bulk waves onto surface 303. Output means 309 then couples surface waves 310 into load 311.

Since the length of surface layer 304 and the angle θ determines the percentage of energy of surface wave 305 which will be leaked into bulk material 301, this apparatus may be used to couple all of the surface wave energy traveling along surface wave 302 onto surface 303, or with a shorter surface layer 304 or a smaller angle θ, part of the energy traveling along surface 302 may be coupled to surface 303 with the remainder continuing to propagate along surface 302.

DESCRIPTION OF AN IN-THE-PLANE COUPLER

Figure 4:
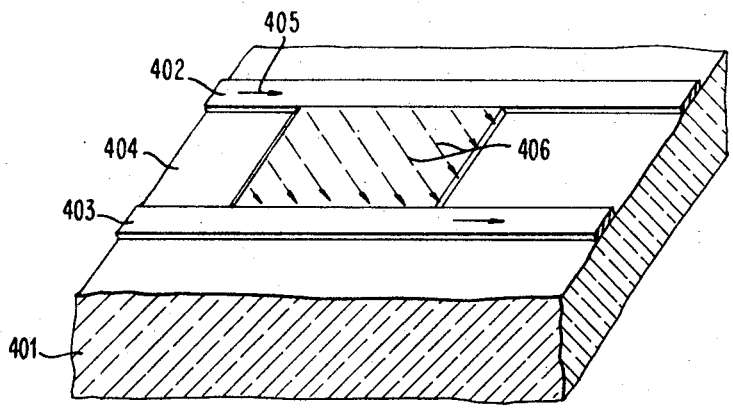
FIG. 4 shows an in-the-plane directional coupler with the coupling region located outside the waveguides.

FIG. 4 shows an in-the-plane coupler. Waveguides 402 and 403 are regions upon the surface of bulk material 401, the phase velocity characteristic of waveguides 402 and 403 being approximately equal to each other and less than the phase velocity characteristic of bulk material 401. Positioned between the two waveguides 402 and 403 in the area where coupling is desired, is coupling region 404. The phase velocity characteristic of coupling region 404 is less than the phase velocity characteristic of waveguides 402 and 403.

OPERATION OF AN IN-THE-PLANE COUPLER

In operation, waves 405 propagating in waveguide 402 approaches that section of waveguide 402 which coupling region 404 effects. The lower phase velocity characteristic of coupling region 404 gradually cause waves 405 to leak into coupling region 404. The leaky waves 406 traverse coupling region 404 and are coupled into waveguide 403. The result is strong coupling between waveguide 402 and 403.

FIG. 4 may represent an in-the-plane coupler for use in optical or surface elastic waveguide devices. In the optical wave case, bulk material 401 is a lossless dielectric slab such as fused quartz and waveguides 402 and 403 are also a lossless dielectric material such as borosilicate glass. The characteristic difference between bulk material 401 and waveguides 402 and 403 is that the index of refraction of bulk material 401 is less than the index of refraction of waveguides 402 and 403. In general, the higher the refractive index of the dielectric material, the slower is the phase velocity of the wave traveling in that material. Coupling region 404 is a dielectric material having an index of refraction greater than the index of refraction of waveguides 402 and 403. Coupling region 404 may also be a thicker layer borosilicate glass than the layers used for waveguides 402 and 403. In other words, since the thicker the layer of borosilicate glass, the greater the index of refraction, thus layers of borosilicate glass for waveguides 402 and 403 and a thick layer of borosilicate glass for coupling region 404 results in the required phase velocity characteristics.

In operation, optical wave 405 propagating in waveguide 402 encounters the effects of coupling region 404 and is leaked into the coupling region 404. When the leaky optical waves traverses coupling regions 404, they are coupled into waveguide 403. Thus, strong coupling results.

In the elastic wave case, bulk material 401 is a material in which elastic waves can be maintained such as fused quartz. The shear velocity characteristic of bulk material 401 is greater than the shear velocity characteristic of waveguides 402 and 403. Coupling region 404 is a material having a shear velocity characteristic less than that of waveguides 402 and 403. The use of thin layers of aluminum for waveguides 402 and 403 and a thick layer of aluminum for coupling region 404 provide the required phase velocity characteristics. The operation of the in-the-plane coupler for the elastic wave case is similar to that of the optical case.

DESCRIPTION OF AN ALTERNATE EMBODIMENT OF AN IN-THE-PLANE COUPLER

Figure 5:
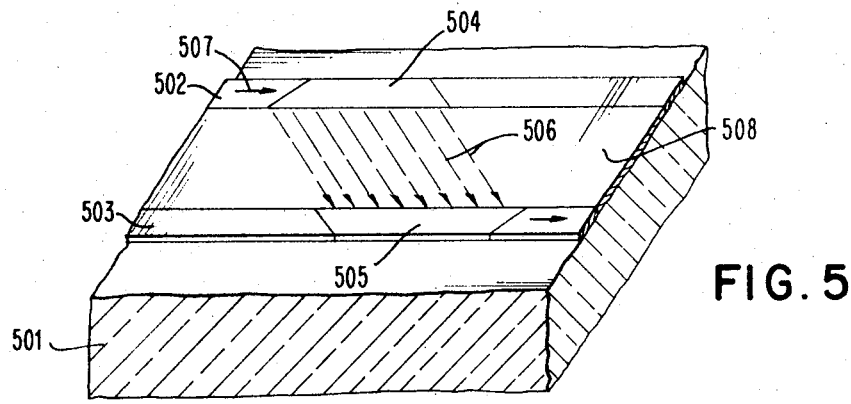
FIG. 5 shows an alternate embodiment of an in-the-plane directional coupler with the coupling regions located within the waveguides.

FIG. 5 shows an alternate embodiment of an in-the-plane wave coupler. Waveguides 502 and 503 guide waves 507 on bulk material 501. Film region 508 is a region in the area where coupling is desired and has a phase velocity characteristic less than bulk material 501 but greater than waveguides 502 and 503. The phase velocity characteristic of waveguides 502 and 503 are approximately equal to each other and are less than the phase velocity characteristic of bulk material 501 and bulk film region 502 in the area where coupling from waveguide 502 to 503 is desired. The phase velocity characteristic of coupling region 504 is greater than the phase velocity characteristic of both film region 508 and waveguide 502 but less than the phase velocity characteristic of bulk material 501. Further, coupling region 504 is tapered so as to permit a gradual leaking of waves, thus preventing impedance mismatch as a result of reflections. Coupling region 505 is positioned in waveguide 503 in the path of leaky waves 506 and couples them into waveguide 503. The phase velocity characteristic of coupling region 505 is approximately equal to the phase velocity characteristic of coupling region 504, both of which are greater than the phase velocity characteristics of film region 508 and the phase velocity characteristic of waveguides 502 and 503.

OPERATION OF AN ALTERNATE EMBODIMENT OF AN IN-THE-PLANE COUPLER

In operation, waves 507 propagating in waveguides 502 gradually encounter coupling region 504. The fast phase velocity characteristic of coupling region 504 causes surface wave 507 to increase in speed and leak into film region 508. Since the phase velocity characteristic of film region 508 is less than that of bulk material 501, waves 507 leak into film region 508. Leaky waves 506 transverse film region 508 and are coupled into waveguide 503 by the presence of coupling region 505.

In the optical case for example, bulk material 501 and film region 508 are a lossless dielectric material such as fused quartz. Waveguides 502 and 503, for example thick layers of borosilicate glass, are positioned on the surface of bulk material 501, with film region 508 between them in the area desired for coupling. The index of refraction of waveguide 502 and waveguide 503 are approximately equal, and both of them are greater than the index of refraction of bulk material 501 and film region 508. The index of refraction of film region 508 is greater than the bulk material 501 but less than that of waveguides 502 and 503. Coupling region 504, a thin layer of borosilicate glass, is located within waveguide 502 in the region where coupling is desired. Coupling region 504 is tapered to minimize mismatch resulting from reflections, and has an index of refraction which is less than the index of refraction of waveguide 502, film region 508 and, bulk material 501. Coupling region 505, also a thin layer of borosilicate glass, is positioned in waveguide 503 so as to receive leaky waves 506. The index of refraction of coupling region 505 is approximately equal to the index of refraction of coupling region 504.

In operation, an optical wave 507 propagating in waveguide 502 gradually encounters coupling region 504. The low index of refraction of coupling region 504 causes optical wave 507 to leak into film region 508. The leaky waves 506 traverse bulk film region 508 and encounter coupling region 505 within waveguide 503. Coupling region 505 then couples leaky waves 506 into waveguide 503.

In a similar manner using the materials employed in the device of FIG. 4, the device of FIG. 5 may be used in an elastic wave environment. The operation of the device in the elastic wave case is the same as in the optical case.

DESCRIPTION OF A SWITCHABLE IN-THE-PLANE COUPLER

Figure 6:
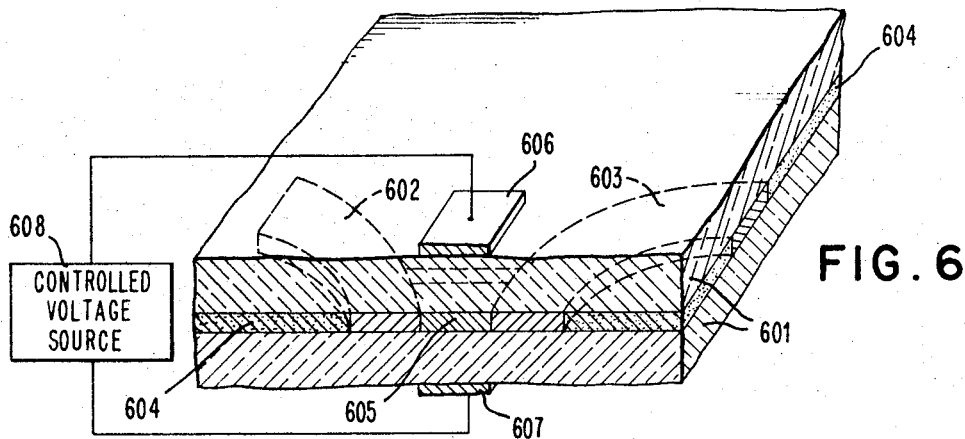
FIG. 6 shows a switchable in-the-plane directional coupler.

FIG. 6 shows a switchable in-the-plane coupler. The outside bulk material 601 forms the upper and lower boundaries of waveguides 602 and 603. One of the properties of the outside bulk material 601 is that its phase velocity characteristic is not affected by the presence of an electric field. Sandwiched in between two layers of outside bulk material 601 is the in-the-plane material 604. A property of the in-the-plane material 604 is that its phase velocity characteristic is altered in the presence of an electric field by the electro-optic effect. Otherwise, the phase velocity characteristic of the in-the-plane material 604 is similar to that of the outside bulk material 601. Whether the phase velocity characteristic is reduced or increased by the electric field is determined by the polarity of the field. Waveguides 602 and 603 are positioned within the in-the-plane material 604 such that waveguide 602 passes within close proximity to waveguide 603. Coupling region 605 is that particular region of the in-the-plane material 604 between waveguides 602 aNd 603 in the area where waveguide 602 and 603 pass one another. Connected to the outside bulk material 601, above and below coupling region 605, are electrodes 606 and 607. These electrodes are connected to a controlled voltage source 608. The phase velocity characteristic of waveguides 602 and 603 are approximately equal to each other and less than the phase velocity characteristic of outside bulk material 601 and in-the-plane material 604.

OPERATION OF A SWITCHABLE IN-THE-PLANE COUPLER

In operation, when the controlled voltage source 608 applies a first polarity voltage to electrodes 606 and 607 so that the electric field existing between them increases the phase velocity characteristic of coupling region 605, waves traveling in waveguides 602 and 603 continue within their guides with no coupling taking place. When controlled voltage source 608 applies a voltage of an opposite polarity to that of the first to electrodes 606 and 607, an electric field is established within the coupling region 605 which reduces the phase velocity characteristic of the in-the-plane material 604 in the coupling region 605 to a value less than the phase velocity characteristic of waveguides 602 and 603. The presence of this low phase velocity material between waveguides 602 and 603 causes waves traveling in waveguide 602 to leak into coupling region 605 and be coupled into waveguide 603. Thus, controlled, switchable coupling is achieved.

When this configuration is used in the switchable coupling of elastic waves, the phase velocity characteristics referred to are the shear velocity characteristics of the various materials. When an electric field is present in the coupling region 605, the electro-acoustic effect causes the region to have a significant reduction in shear velocity characteristics.

Bulk material 601 is aluminum nitride. The in-the-plane material 604 except in the coupling region 605 is an optical cement such as transparent epoxy. Both the waveguides 602 and 603 and the coupling region 605 are lithium niobate. The electric field which continually biases coupling region 605 is directed so as to have negligible effects on waveguides 602 and 603.

When the configuration of FIG. 6 is used in the optical waveguide case, the various materials referred to are lossless dielectrics having different indexes of refraction. The correlation between phase velocity characteristics and index of refraction is that the greater the index of refraction, the lower the phase velocity characteristic. Thus, the index of refraction of waveguides 602 and 603 would be greater than the index or refraction of the outside bulk materiaL 601 and the in-the-plane material 604. The materials used in the elastic wave case are also suitable for the optical wave case with the exception that the bulk material 601 in the optical wave case is fused quartz.

DESCRIPTION OF A SWITCHABLE FILM-TO-BULK COUPLER

Figure 7:
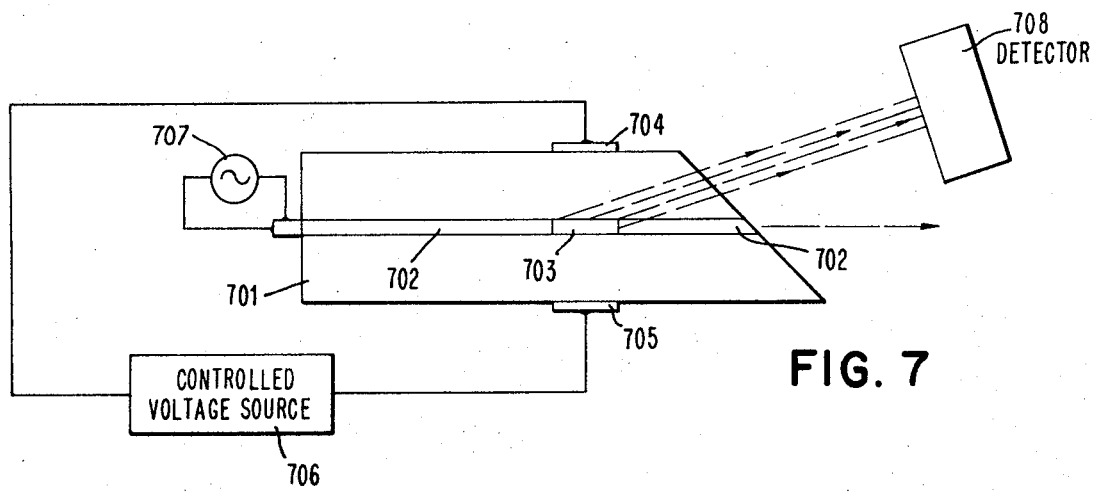
FIG. 7 shows a switchable film-to-bulk coupler.

The leaky wave technique described above should not be limited to in-the-plane coupling. Another use for the leaky wave technique is shown in FIG. 7, which shows a film-to-bulk coupler. As in FIG. 6, bulk material 701, a conducting glass for example, is placed above and below in-the-plane material 702. The in-the-plane material 702 has a higher refractive index than bulk material 701 and the refractive indexes of both bulk material 701 and in-the-plane material 702 are not affected by the presence of an electric field. Switchable material 703, having a refractive index equal to that of the in-the-plane material 702, constitutes a portion of the region bounded by bulk material 701. The refractive index of switchable material 703 becomes smaller than that of the bulk material 701 when in the presence of an electric field of a first polarity. Electrodes 704 and 705 are placed on bulk material 701, above and below switchable region 703, respectively. Electrodes 704 and 705 are connected to controllable voltage source 706. Input means 707 couples optical waves into in-the-plane material 702 and detector 708 detects the output of the device.

OPERATION OF A SWITCHABLE FILM-TO-BULK COUPLER

In operation, light waves propagating in bulk material 701 are guided by in-the-plane material 702. With no voltage applied to electrodes 704 and 705, the light waves exit the device in a direction parallel to the in-the-plane material 702. When a voltage is applid to electrodes 704 and 705, the electric field established decreases the refractive index switchable material 703 according to the electro-optic effect above that of bulk material 701. This results in the light waves leaking into bulk material 701 and exiting the device at an angle to the plane of the in-the-plane material 702. In a similar device, acoustic waves may be coupled out in the same manner.

ADVANTAGES

From the above discussion, the advantages of the invention are now readily apparent. Efficient directional coupling is achieved without the requirement of placing the waveguides extremely close to one another. Further, the requirement that the coupling waveguides remain close to one another for a sufficient distance to allow proper coupling, is greatly reduced. Finally, this invention offers the significant advantage of switchable directional coupling.

While the invention has been particularly shown and described with reference to the preferred embodiment thereof, it will be understood by those of skill in the art that various changes in form and detail may be made therein without departing from the spirit and scope of the invention.

We claim:

1. A leaky wave coupler comprising:
a bulk material having a first phase velocity characteristic in which waves propagate;
a first longitudinal region in said bulk material, having a second phase velocity characteristic less than said first phase velocity characteristic wherein said first longitudinal region guides said waves;
a second longitudinal region in said bulk material, having a third phase velocity characteristic less than said first phase velocity characteristic spaced from said first longitudinal region;
a coupling region having a fourth phase velocity characteristic less than said second and third phase velocity characteristic, in said bulk material between a portion of said first longitudinal region and said second longitudinal region wherein said coupling region causes said waves to transfer between said first longitudinal regions and said second longitudinal region;
an input means for coupling said waves into said first longitudinal region; and
an output means for coupling said waves out of said second longitudinal region.

2. A leaky wave coupler comprising:
a bulk material with a first phase velocity characteristic having a surface upon which waves propagate;
a first longitudinal region positioned upon said surface of said bulk material, with a second phase velocity characteristic less than said first phase velocity characteristic wherein said first longitudinal region guides said waves;
a second longitudinal region with a third phase velocity characteristic less than said first phase velocity characteristic positioned upon said surface of said bulk material spaced from said first longitudinal region;
a coupling region with a fourth phase velocity characteristic less than said second phase velocity characteristic and said third phase velocity characteristic positioned upon said surface of said bulk material between a portion of said first longitudinal region and said second longitudinal region wherein said coupling region causes said waves to transfer between said first longitudinal region and said second longitudinal region;
an input means for coupling said waves into said first longitudinal region; and
an output means for coupling said waves out of said second longitudinal region.

3. A switchable leaky wave coupler comprising:
a bulk material with a first phase velocity characteristic having a surface upon which waves propagate;
a first longitudinal region with a second phase velocity characteristic less than said first phase velocity characteristic positioned upon said surface of said bulk material wherein said first longitudinal region guides said waves;
a second longitudinal region with a third phase velocity characteristic less than said first phase velocity characteristic, positioned upon said surface of said bulk material spaced from said first longitudinal region;
a coupling region positioned upon said surface of said bulk material positioned between and for switchably coupling waves between a portion of said first longitudinal region and said second longitudinal region;
an electric field source directed towards said coupling region for producing an electric field;
control circuitry connected to said electric field source;
said coupling region having a fourth phase velocity characteristic greater than said second and said third phase velocity characteristic in the presence of a first polarity of said electric field, for conducting said waves from said first to said second longitudinal region, and less than said second and said third phase velocity characteristics in the presence of the second polarity of said electric field, for preventing the conduction of said waves from said first to said second longitudinal region;
an input means for coupling said waves into said first longitudinal region; and
an output means for coupling said waves out of said second longitudinal region.

4. A leaky wave surface-to-surface coupler comprising:
a bulk material with a first phase velocity characteristic having a first surface and a second surface opposite one another upon which waves propagate;
a first layer positioned upon said first surface in the path of said waves propagating on said first surface said first layer having a second phase velocity characteristic greater than said first phase velocity characteristic;
said first layer propagating the evanscent portion of said waves coupling said layer at a faster rate than the portion of the waves remaining in the bulk material, thereby steering the wave front of said waves toward said bulk material and causing said waves to leak into said bulk material;
a second layer positioned upon said second surface in the path of said waves leaked into said bulk material by said first layer, said second layer having a third phase velocity characteristic greater than said first phase velocity characteristic;
an input means for coupling said waves into said first surface; and
an output means for coupling said waves off of said second surface.

5. A leaky wave surface-to-bulk coupler comprising:
a bulk material with a first phase velocity characteristic having a surface upon which waves propagate;

a layer positioned upon said surface in the path of said waves propagating on said surface, said layer having a second phase velocity characteristic greater than said first phase velocity characteristic;

said layer propagating the evanscent portion of said waves coupling said layer at a faster rate than the portion of said waves remaining in said bulk material, thereby steering the wave front of said waves toward said bulk material and causing said waves to leak from said surface into said bulk material;

an input means for coupling said waves into said surface; and an output means for coupling said waves out of said bulk material.

6. A leaky wave coupler comprising:

a bulk material having a first phase velocity characteristic in which waves propagate;

a first longitudinal region in said bulk material, having a second phase velocity characteristic less than said first phase velocity characteristic wherein said first longitudinal region guides said waves;

a second longitudinal region in said bulk material, having a third phase velocity characteristic less than said first phase velocity characteristic spaced from said first longitudinal region;

a first coupling region with a fourth phase velocity characteristic less than said second phase velocity characteristic positioned within a portion of said first longitudinal region wherein said first coupling region causes said waves propagating in said first longitudinal region to leak into said bulk material;

a second coupling region with a fifth phase velocity characteristic less than said third phase velocity characteristic positioned within said second longitudinal region wherein said second coupling region causes said waves leaked into said bulk material to couple into said longitudinal region;

an input means for coupling said waves into said first longitudinal region; and an output means for coupling said waves out of said second longitudinal region.

7. The apparatus of claim 6 further comprising:

an inter-guide region within said bulk material positioned between said first longitudinal region and said second longitudinal region, said inter-guide region having a sixth phase velocity characteristic greater than said second and third phase velocity characteristics, and less than said first and fourth and fifth phase velocity characteristics.

8. A switchable film-to-bulk coupler comprising:

a transparent bulk material having a first phase velocity characteristic in which waves propagate;

an in-the-plane material within said bulk material, having a second phase velocity characteristic less than said first phase velocity characteristic wherein said in-the-plane material guides said waves;

a switchable material located within said in-the-plane material;

an electric field source directed towards said switchable material for producing an electric field;

control circuitry connected to said electric field source;

said switchable material having a third phase velocity characteristic approximately equal to said second phase velocity characteristic in the presence of a first polarity of said electric field and greater than said second phase velocity characteristic in the presence of a second polarity of said electric field;

an input means for coupling said waves into said in-the-plane material; and a detecting means for detecting the output of said film-to-bulk coupler.

* * * * *